United States Patent
Baughman et al.

(10) Patent No.: US 11,921,755 B2
(45) Date of Patent: Mar. 5, 2024

(54) DATA CLUSTERING USING ANALYSIS OF MULTIPLE ENCODING TECHNIQUES

(71) Applicant: International Business Machines Corporation, Armonk, NY (US)

(72) Inventors: Aaron K. Baughman, Cary, NC (US); Kavitha Hassan Yogaraj, Bangalore (IN); Sudeep Ghosh, Bengaluru (IN); Shikhar Kwatra, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 17/506,315

(22) Filed: Oct. 20, 2021

(65) Prior Publication Data
US 2023/0123240 A1 Apr. 20, 2023

(51) Int. Cl.
*G06F 16/28* (2019.01)
*G06F 16/22* (2019.01)
(Continued)

(52) U.S. Cl.
CPC ........ *G06F 16/285* (2019.01); *G06F 16/2228* (2019.01); *G06F 16/288* (2019.01);
(Continued)

(58) Field of Classification Search
CPC ........ G06N 10/00; G06N 10/20; G06N 10/40; G06N 10/60; G06N 10/70; G06N 10/80;
(Continued)

(56) References Cited

U.S. PATENT DOCUMENTS

| 7,599,893 B2 * | 10/2009 | Sapir ................ G06N 5/025 |
| | | 706/14 |
| 8,266,121 B2 | 9/2012 | Roitblat et al. |

(Continued)

FOREIGN PATENT DOCUMENTS

WO    2020056324 A1    3/2020

OTHER PUBLICATIONS

Data Novia, Agglomerative Hierarchical Clustering, captured Jul. 2, 2020, https://web.archive.org/web/20200702192358/https://www.datanovia.com/en/lessons/agglomerative-hierarchical-clustering/ (Year: 2020).*

(Continued)

*Primary Examiner* — Allen S Lin
(74) *Attorney, Agent, or Firm* — Garg Law Firm, PLLC; Rakesh Garg; Michael O'Keefe

(57) ABSTRACT

An embodiment includes building a hierarchical data structure using a hybrid hierarchical clustering process. The hybrid hierarchical clustering process comprises one or more iterations of a level-building process. An embodiment of the level-building process comprises building, by a classical processor, a first parent level of a current uppermost level of the hierarchical data structure by clustering classically-encoded clusters of the current uppermost level. The embodiment of the level-building process also comprises identifying, by a quantum processor, a set of candidate clustering options for clustering quantum-encoded clusters of the current uppermost level for a second parent level, including forming each of the set of candidate clustering options in parallel using respective different quantum encoding spaces. The embodiment of the level-building process also comprises building, by the classical processor, the second parent level based on a subset of the candidate clustering options.

18 Claims, 12 Drawing Sheets

(51) Int. Cl.
  *G06F 18/21* (2023.01)
  *G06F 18/211* (2023.01)
  *G06F 18/231* (2023.01)
  *G06N 10/00* (2022.01)

(52) U.S. Cl.
  CPC .......... *G06F 18/211* (2023.01); *G06F 18/217* (2023.01); *G06F 18/231* (2023.01); *G06N 10/00* (2019.01)

(58) Field of Classification Search
  CPC . G06F 16/2228; G06F 16/288; G06K 9/6219; G06K 9/6228; G06K 9/6262; G06V 10/7625; G06V 30/19107; G06V 10/771; G06V 30/1912; G06V 10/776; G06V 10/778; G06V 30/1916; G06V 30/19167; G06V 30/302
  See application file for complete search history.

(56) References Cited

U.S. PATENT DOCUMENTS

| | | | |
|---|---|---|---|
| 8,700,547 | B2 | 4/2014 | Long et al. |
| 10,169,445 | B2 | 1/2019 | Weinstein et al. |
| 10,318,881 | B2 | 6/2019 | Rose et al. |
| 2018/0060727 | A1* | 3/2018 | Rainwater ............ G06N 3/0445 |
| 2020/0118025 | A1* | 4/2020 | Romero ................. G06N 3/088 |
| 2020/0349459 | A1 | 11/2020 | Cao et al. |
| 2021/0133614 | A1* | 5/2021 | Ashrafi ................. G06N 10/00 |
| 2021/0192381 | A1* | 6/2021 | Ijaz ...................... G06N 3/0454 |
| 2021/0256515 | A1* | 8/2021 | Gale .................. G06Q 20/3827 |

OTHER PUBLICATIONS

Ahn et al., A Similarity-Based Hierarchical Clustering Method for Manufacturing Process Models, Sustainability, 2019, 11, 2560.
Hu et al., A Hierarchical Feature Extraction Model for Multi-Label Mechanical Patent Classification, Sustainability, 2018, 10(1), 219.
Etumnu et al., A Clustering Approach to Understanding Farmers' Success Strategies, Journal of Agricultural and Applied Economics (2020), 52, pp. 335-351, 2020.
ip.com, StratOps—Continuous Strategic Alignment of IT for Sustainable Competitive Advantage, Jun. 9, 2020.
ip.com, Blockchain-based Clustering of Business Objects, Dec. 17, 2018.
Bhagawati et al., Documents clustering using quantum clustering algorithm, 2016 International Conference on Microelectronics, Computing and Communications (MicroCom), Jan. 23-25, 2016.
Ukai et al., Experimental realization of quantum teleportation as cluster computation, 2009 Conference on Lasers and Electro-Optics and 2009 Conference on Quantum electronics and Laser Science Conference, Jun. 2-4, 2009.
Yao et al., Quantum Clustering Algorithm based on Exponent Measuring Distance, 2008 IEEE International Symposium on Knowledge Acquisition and Modeling Workshop, Dec. 21-22, 2008.
Aimeur et al., Quantum clustering algorithms, ICML '07: Proceedings of the 24th international conference on Machine learning, Jun. 2007.
Li et al., Quantum-inspired evolutionary clustering algorithm based on manifold distance, GEC '09: Proceedings of the first ACM/SIGEVO Summit on Genetic and Evolutionary Computation, Jun. 2009.

* cited by examiner

DATA CLUSTERING USING ANALYSIS OF MULTIPLE ENCODING TECHNIQUES

BACKGROUND

The present invention relates generally to a method, system, and computer program product for data processing. More particularly, the present invention relates to a method, system, and computer program product for data clustering using analysis of multiple encoding techniques.

A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented by 1 and 0.

Recently a new type of processor has been introduced that is referred to as a quantum processor. Hereinafter, a "Q" prefix in a word or phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

A quantum processor (q-processor) uses the unique nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 inference between possible outcomes for an event. Entanglement means that qubits in a superposition can be correlated with each other in a non-classical way; that is, the state of one (whether it is a 1 or a 0 or both) can depend on the state of another, and that there is more information contained within the two qubits when they are entangled than as two individual qubits. Using these two principles, qubits operate as processors of information, enabling quantum computers to function in ways that allow them to solve certain difficult problems that are intractable using conventional computers.

SUMMARY

The illustrative embodiments provide for data clustering using analysis of multiple encoding techniques. An embodiment includes building a hierarchical data structure using a hybrid hierarchical clustering process, where the hierarchical data structure comprises a plurality of objects that span a plurality of levels from a lowest level of single-object clusters to a highest level comprising a final cluster of the clusters, and where the hybrid hierarchical clustering process comprises an iteration of a level-building process. An embodiment of the level-building process comprises building, by a classical processor, a first parent level of a current uppermost level of the hierarchical data structure by clustering classically-encoded clusters of the current uppermost level where, upon completion of the first parent level, the first parent level becomes the current uppermost level of the hierarchical data structure. The embodiment of the level-building process also comprises identifying, by a quantum processor, a set of candidate clustering options for clustering quantum-encoded clusters of the current uppermost level for a second parent level, where the identifying comprises forming each of the set of candidate clustering options in parallel using respective different quantum encoding spaces. The embodiment of the level-building process also comprises building, by the classical processor, the second parent level based on a subset of the candidate clustering options where, upon completion of the second parent level, the second parent level becomes the current uppermost level of the hierarchical data structure. The embodiment also includes determining, by the classical processor, whether to perform another iteration of at least a portion of the level-building process based at least in part on a comparison of the hierarchical data structure to an exit criterion. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
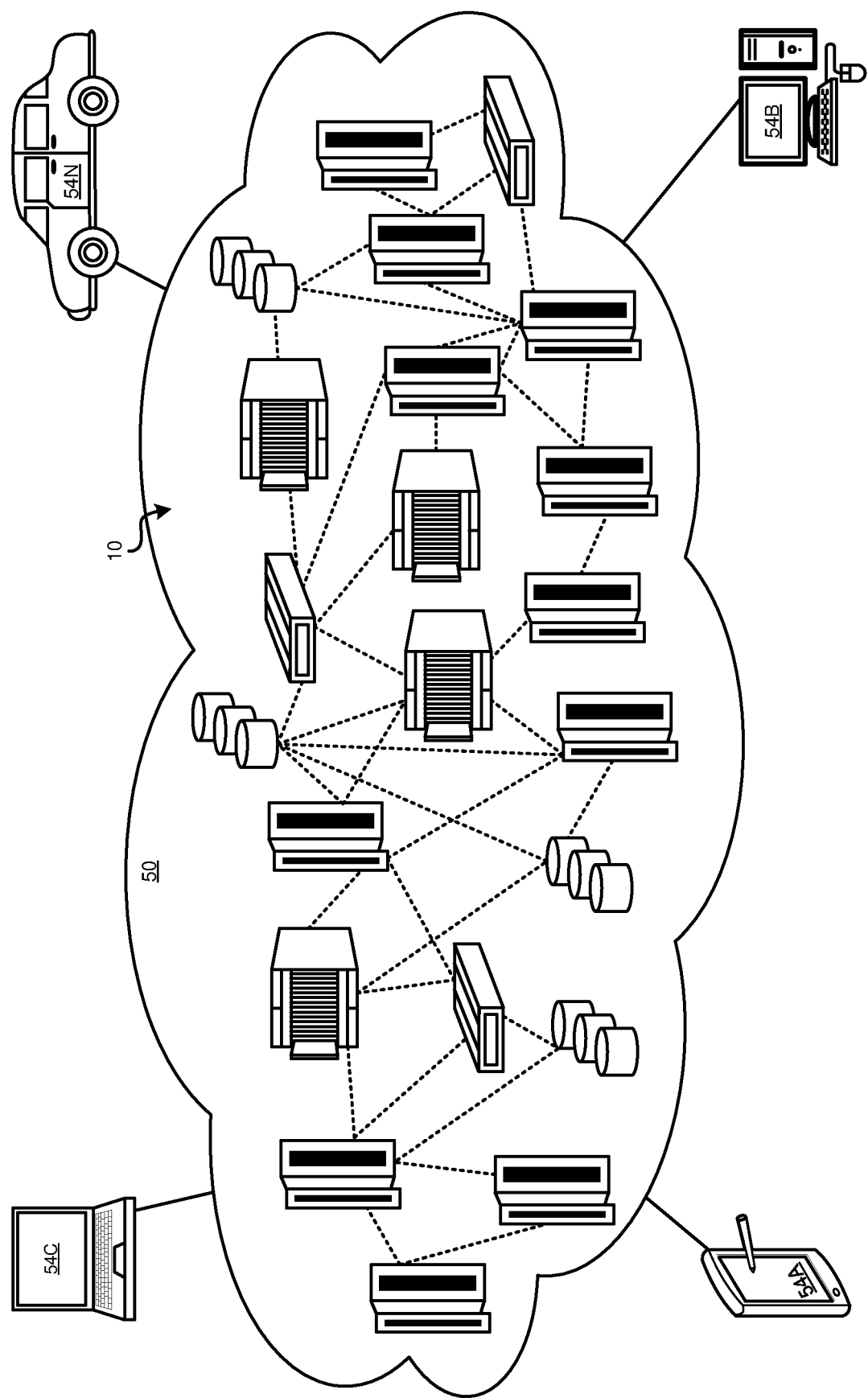
FIG. 1 depicts a cloud computing environment according to an embodiment of the present invention.

Computer systems store and process electronic representations of objects, such as documents and images. The electronic representation of an object can be referred to as object data. There are many scenarios in which it is useful to organize objects into groups, for example based on some relationship or similarity between the objects. The process a computer system performs for organizing objects into groups (or "clusters") is typically referred to as clustering.

There are a variety of ways to define similarity for clustering objects. Some clustering techniques involve the use of a vector space model in which the objects are represented as vectors. Similarity between objects can then be measured using cosine similarity, cross product, or Euclidean distance metrics, where distance is inversely related to similarity. In the vector space model, each word in the vocabulary is represented by a position in the vector.

Commonly used procedures for constructing clusters can be categorized as either agglomerative or partitional. In the agglomerative approach, clusters start small, typically with only one object. Clusters are then built by adding objects to existing clusters. The partitional approach typically starts with one cluster, and each cluster is thereafter subdivided to make new smaller clusters.

However, many commonly used clustering algorithms are limited in their usefulness by their computational complexity. Many clustering algorithms take an enormous or impractical amount of time to complete the many iterations through the data that would be needed to cluster the objects. This time requirement makes them impractical for use in large data sets when the clustering is performed by computers commonly in use today, which are referred to herein as classical computers (also referred to herein as "conventional" computers or conventional nodes, or "CN").

The present embodiments recognize that quantum computing may be used for clustering using the properties of quantum mechanics, such as gates, to rotate encoded data around a 3-dimensional space. Specifically, quantum feature maps and kernels may be used to represent object data in quantum Hilbert space, thus providing infinite non-linear dimensions for the clustering process. These representations created in the Hilbert space can be useful for representing and processing higher numbers of dimensions of object data in which more distinct clusters can be identified.

Aspects of the disclosure address the deficiencies described above by providing mechanisms (e.g., systems, methods, machine-readable media, etc.) that apply data encoding techniques that include Quantum Feature maps and Classical raw feature representations in combination to a data set as part of an unsupervised process for identifying data clusters. This combined quantum and classical approach applies a hybrid combination of techniques to a historically processing and time intensive process. The embodiments provide for automated unsupervised machine-learning using a combination of classical and quantum processors, resulting both. for an efficient time and computational resource management.

In some embodiments, the mechanisms provide for flexible and adaptable application of different combinations of feature encoding techniques by implementing an automated technique for assessing the suitability of different encoding options to different datasets. This further improves the efficiency with which a computer system encodes, clusters, and structures data.

In some embodiments, the mechanisms automatically generate a hierarchical data structure using a hybrid hierarchical clustering process. For example, in some embodiments, an Agglomerative Hierarchical clustering algorithm may be used to generate the hierarchical data structure, where the hierarchical data structure is a dendogram representation of the results of the agglomerative clustering algorithm.

In some embodiments, to facilitate the merger of data points, disclosed mechanisms may compute distances between pairs of data points, for example, by using any known distance, similarity, or dissimilarity measurement technique. For example, in some embodiments, clustering is based on distance, which is measured using a known technique such as Euclidean Distance, Manhattan Distance, Minkowski Distance, Jaccard Similarity Coefficient, Cosine Similarity, or Gower's Similarity Coefficient. As another example, in some embodiments, clustering is based on similarity or dissimilarity, which is measured using a known technique such as single linkage, complete linkage, average linkage, centroid method, or Ward's method. In some embodiments, a new cluster is formed as each new level is added by combining the closest or most similar clusters.

While disclosed embodiments are presented using an agglomerative clustering algorithm for clustering data points, one skilled in the art will recognize that any appropriate clustering algorithm may be used. For example, a k-means clustering or other hierarchical clustering algorithm may be used instead of the agglomerative clustering algorithm.

In some embodiments, disclosed mechanisms receive a data set comprising data representative of objects that are provided for clustering. For example, in some such embodiments, the data set is received from a user who seeks to organize the objects into groups. The data set may include data representative of any kind of real or virtual objects that are sought to be organized into clusters.

In some embodiments, disclosed mechanisms perform various types of data preprocessing, which typically includes feature learning and feature extraction and encoding, which are performed using a classical processor. The disclosed mechanisms may use any desired known techniques, such as an autoencoder, for reducing the feature space.

In some embodiments, disclosed mechanisms build a hierarchical data structure using a hybrid hierarchical clustering process. In some such embodiments, the hierarchical data structure results from one or more iterations of the level-building process that includes clustering of classical-encoded data by a classical processor and clustering of quantum-encoded data by a quantum processor.

In some embodiments, disclosed mechanisms build, using a classical processor, a first parent level of a current uppermost level of the hierarchical data structure. For example, in some embodiments, the mechanisms begin with the first level of the hierarchical data structure comprising each of the classically-encoded objects in respective single-object clusters. In some such embodiments, for the first iteration of the level building process, the mechanisms use a classical processor to build a first parent level of the first level, i.e., the second level of the hierarchical data structure. Upon completion of the first parent level, the first parent level built by the classical processor becomes the current uppermost level of the hierarchical data structure.

Next, the mechanisms use a quantum processor to identifies a set of candidate clustering options for clustering quantum-encoded clusters of the current uppermost level. In some embodiments, the mechanisms encode the data of the current uppermost level in a plurality of different quantum encoding spaces. There are various known ways to encode classical information into a quantum state. As a non-limiting example, embodiments disclosed herein use basis encoding, amplitude encoding, angle encoding, higher-order embedding, but other known techniques may be used.

Basis encoding is a technique where classical data in the form of binary data (using 0s and 1s) is encoded as a superposition of the quantum states. For example, using basis encoding to encode a classical numerical data point, the value of the numerical data point is first approximated by its binary representation. The resulting bitstring $(b_1, \ldots, b_N)$ is then encoded by the $|b_1, \ldots, b_N\rangle$ quantum state. For example, the number "2" is represented as a binary bitstring (1 0), which is then encoded by the $|10\rangle$ quantum state. Therefore, every bit of the bitstring is represented by a single qubit.

Amplitude encoding (also referred to sometimes as referred to as Wavefunction Encoding) is a technique where classical data in the form of binary data is encoded as probability amplitude values of a quantum system wavefunction $\psi$. This may be accomplished by first pre-processing the data, where the pre-processing includes first normalizing the length of the input vector to have a length of 1 (because the squared moduli of the amplitudes of a quantum state must have of 1). Also, the pre-processing may next include making sure that the number of dimensions of the input vector is equal to a power of two or increasing the number of dimensions to the next power of two (because the vector space of an n qubit register has dimension $2^n$), for example by padding the input vector with extra zeros. A wavefunction w that defines measurement probabilities of a quantum system is used to encode the pre-processed data by using the amplitudes of the quantum system to represent data values.

Angle encoding is a technique where data values of the classical data are stored as rotations of quantum states. In other words, the degree to which a quantum state is rotated is equal to the value represented by the classical data. This may be accomplished by first pre-processing the data by normalizing each data point to the interval $[0, 2\pi c]$. Then, each data point of the pre-processed data is represented by a single qubit where a rotation equal to the normalized value is applied about the y-axis of the Block Sphere.

Higher-order encoding refers to mapping a classical dataset onto the Bloch sphere using quantum feature maps that act as quantum kernel functions. Higher-order encoding takes advantage of the high-dimensional quantum Hilbert space.

In some embodiments, disclosed mechanisms builds, using the classical processor, a second parent level based on a subset of the candidate clustering options. For example, in some embodiments, the disclosed mechanisms determine the accuracy of each of the candidate clustering options created by the quantum processing and drops the least accurate clustering option. In addition, the encoding space associated with the least accurate clustering option will not be used for subsequent iterations of the level building process. The remaining clustering options then form a subset of the candidate clustering options, and the disclosed mechanisms use that subset to build the second parent level of the hierarchical data structure.

In some embodiments, disclosed mechanisms decode each of the subset of candidate clustering options into classically-encoded clusters, thereby forming a subset of classically-encoded candidate clustering options of the set of candidate clustering options. In some such embodiments, the disclosed mechanisms determine classically-encoded clusters of the second parent level based on averaging corresponding classically-encoded candidate clusters of each of the subset of classically-encoded candidate clustering options.

In some embodiments, disclosed mechanisms also determine if halting criteria has been met, which would indicate that the clustering process has been completed. For example, in some embodiments, the halting criteria may include a target number of clusters, in which case the disclosed mechanisms would determine if the existing hierarchical data structure includes no more than the target number of clusters. If the halting condition is satisfied, then the process ends. Otherwise, the disclosed mechanisms initiate another iteration of the level-building process.

In some embodiments, before beginning another iteration of the level-building process, the disclosed mechanisms test the accuracy of the clusters in classical encoding space. The results of the accuracy test are then used as a basis for determining the scope of the next iteration of the level-building process. Specifically, if an accuracy threshold is met, then the next iteration of the level-building process is performed as described above beginning with the classical encoding. On the other hand, if the accuracy threshold is not met, then the next iteration of the level-building process is performed, but bypasses the classical clustering.

Also, note that for each iteration of the level-building process, the number of quantum encodings n is reduced by 1. In some embodiments, disclosed mechanisms determine the accuracy of each of the candidate clustering options created by the quantum processing and excludes the least accurate clustering option for subsequent iterations of the level building process.

In some embodiments, the clustering system uses a word embedding technique that includes language modeling and feature learning techniques in natural language processing (NLP) in which corpus terms from the corpus are mapped to vectors of real numbers in a low-dimensional space relative to the size of the corpus. In a non-limiting example, the clustering system excludes corpus terms that are stopwords when converting corpus terms to vectors. In some embodiments, the clustering system excludes stopwords that include the most common words in a language (e.g., "a", "the", "is", "at", etc. . . . ), short function words, articles, prepositions, and/or words that lack significance for search queries.

In a non-limiting exemplary embodiment, clustering system converts features of data objects to a vector (a1, a2, . . . , an), where n is a positive integer representing the number of dimensions of the vector and a1, a2, . . . , an are the numerical values of each dimension of the vector. In some embodiments, the clustering system applies a clustering algorithm to determine sets of concepts that form clusters. In some embodiments, the clustering system uses an agglomerative hierarchical or k-means algorithm to identify clusters. In some embodiments, the clustering system computes Euclidean distances between features to identify clusters, where the distance is indicative of relatedness or closeness to corresponding features of other objects in the assigned cluster. In some embodiments, the clustering system uses a k-medoids clustering, connectivity-based clustering, centroid-based clustering, distribution-based clustering, density-based clustering, fuzzy clustering, biclustering, or any other suitable clustering model.

In some embodiments, the clustering system operates responsive to an input from a user. For example, in some embodiments, the clustering system operates responsive to an input from a user device. In some embodiments, the clustering system operates responsive to a query from the user, where the query identifies a specified dataset about which the user is seeking additional information.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
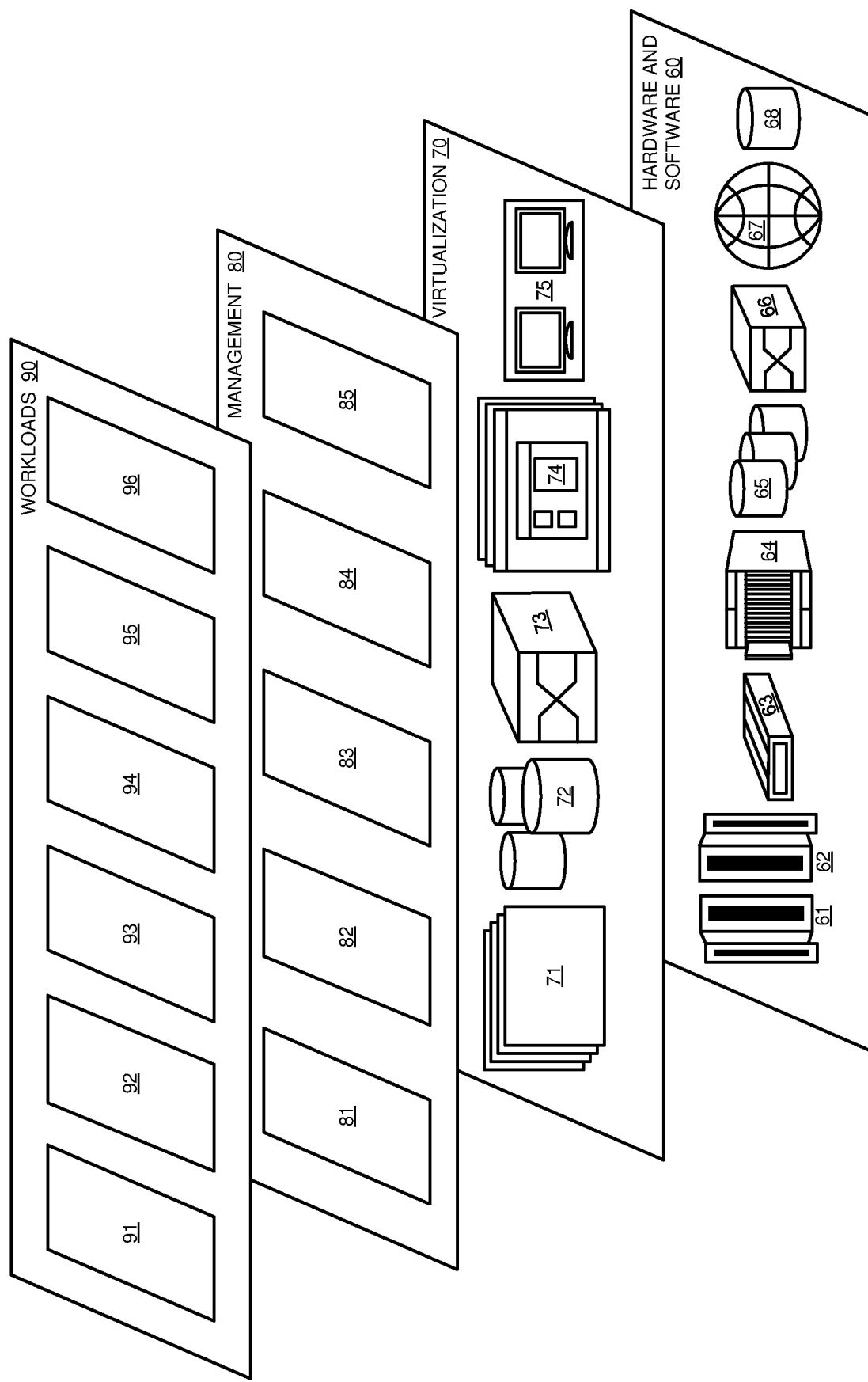
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid data clustering processing 96.

Figure 3:
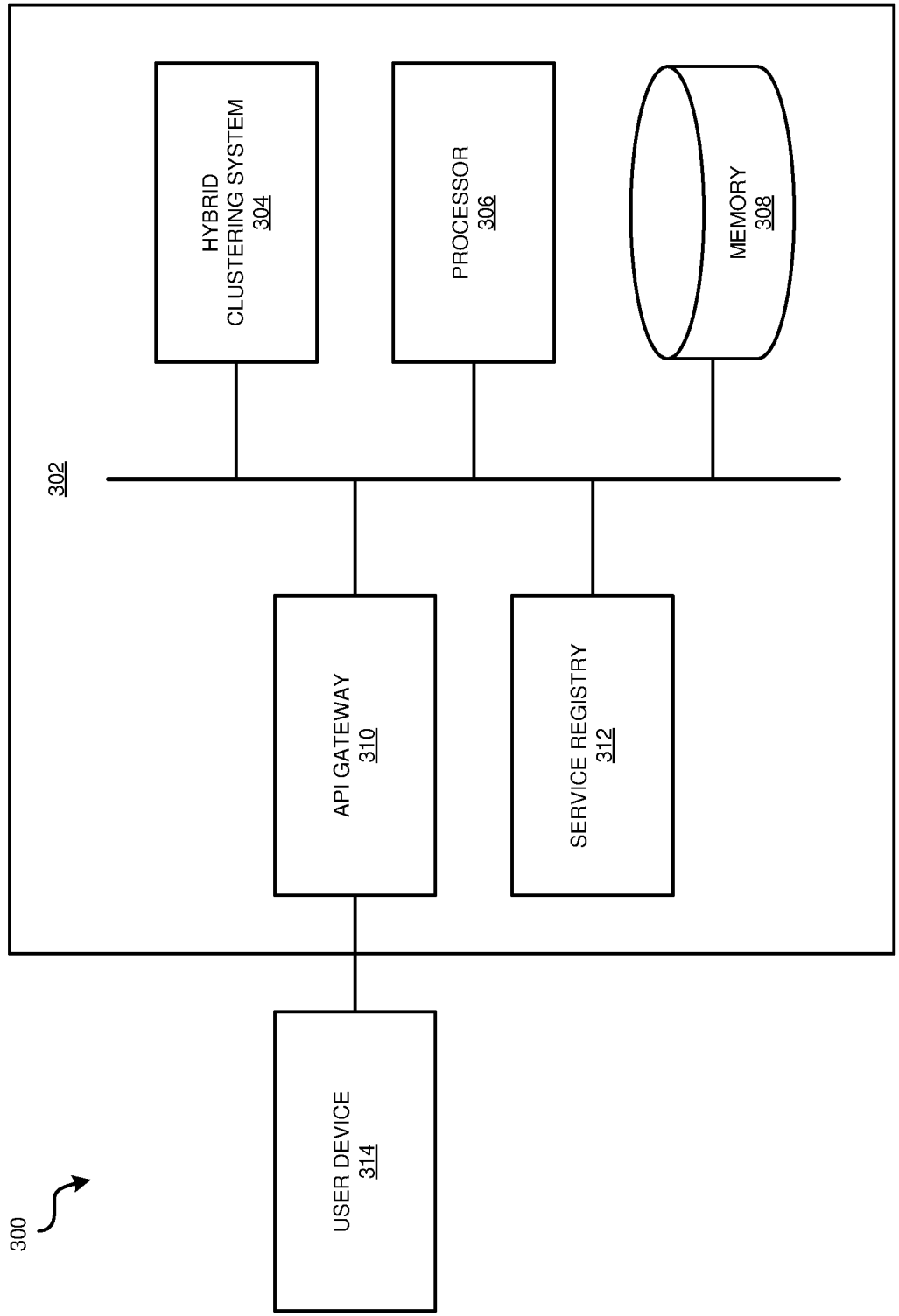
FIG. 3 depicts a block diagram of an example cloud computing environment in accordance with an illustrative embodiment.

With reference to FIG. 3, this figure depicts a block diagram of an example cloud computing environment 300 in accordance with an illustrative embodiment. In the illustrated embodiment, the cloud computing environment 300 includes service infrastructure 302 that provides services and service instances to one or more user devices 314, including clustering services from a hybrid clustering system 304. In some embodiments, the hybrid clustering system 304 is deployed in workloads layer 90 of FIG. 2. By way of example, in some embodiments, hybrid clustering system 304 provides hybrid data clustering processing 96 in FIG. 2.

In the illustrated embodiment, the user device 314 communicates with service infrastructure 302 across one or more networks via an API gateway 310. In some embodiments, the service infrastructure 302 uses a distributed microservice architecture. In some such embodiments, the hybrid clustering system 304 is a microservices-based application that runs as a distributed system across one or more servers. In various embodiments, service infrastructure 302 and its associated hybrid clustering system 304 serve multiple users and multiple tenants. A tenant is a group of users (e.g., a company) who share a common access with specific privileges to the software instance. Service infrastructure 302 ensures that tenant specific data is isolated from other tenants.

In some embodiments, user device 314 connect with API gateway 310 via any suitable network or combination of networks such as the Internet, etc. and use any suitable communication protocols such as Wi-Fi, Bluetooth, etc. Service infrastructure 302 may be built on the basis of cloud computing. API gateway 310 provides access to client applications like hybrid clustering system 304. API gateway 310 receives service requests issued by client applications, and creates service lookup requests based on service requests. As a non-limiting example, in an embodiment, the user device 314 executes a routine to initiate a request to the hybrid clustering system 304 for clustering processing.

In the illustrated embodiment, the service infrastructure 302 also includes, or is otherwise associated with, at least one memory 308 that includes at least one computer readable storage medium that stores computer readable program instructions (e.g., computer readable program instructions can include, but are not limited to, the hybrid clustering system 304 and associated components), and can store any data generated by hybrid clustering system 304 and associated components. In the illustrated embodiment, the service infrastructure 302 includes, or is otherwise associated with, at least one processor 306 that executes computer readable program instructions stored in memory 308.

In the illustrated embodiment, service infrastructure 302 includes a service registry 312. In some embodiments, service registry 312 looks up service instances of hybrid clustering system 304 in response to a service lookup request such as one from API gateway 310 in response to a service request from user device 314. For example, in some embodiments, the service registry 312 looks up service instances of hybrid clustering system 304 in response to requests related to clustering processing from the user device 314.

In some embodiments, the service infrastructure 302 includes one or more instances of the hybrid clustering system 304. In some such embodiments, each of the multiple instances of the hybrid clustering system 304 run independently on multiple computing systems. In some such embodiments, hybrid clustering system 304, as well as other service instances of hybrid clustering system 304, are registered in service registry 312.

In some embodiments, service registry 312 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 312 ranks service instances based on their respective performance characteristics, and selects top-ranking service instances for service discovery or service lookup requests. In the event that a service instance becomes unresponsive or, unhealthy, the service registry will no longer provide its address or information about this service instance to other services.

Figure 4:
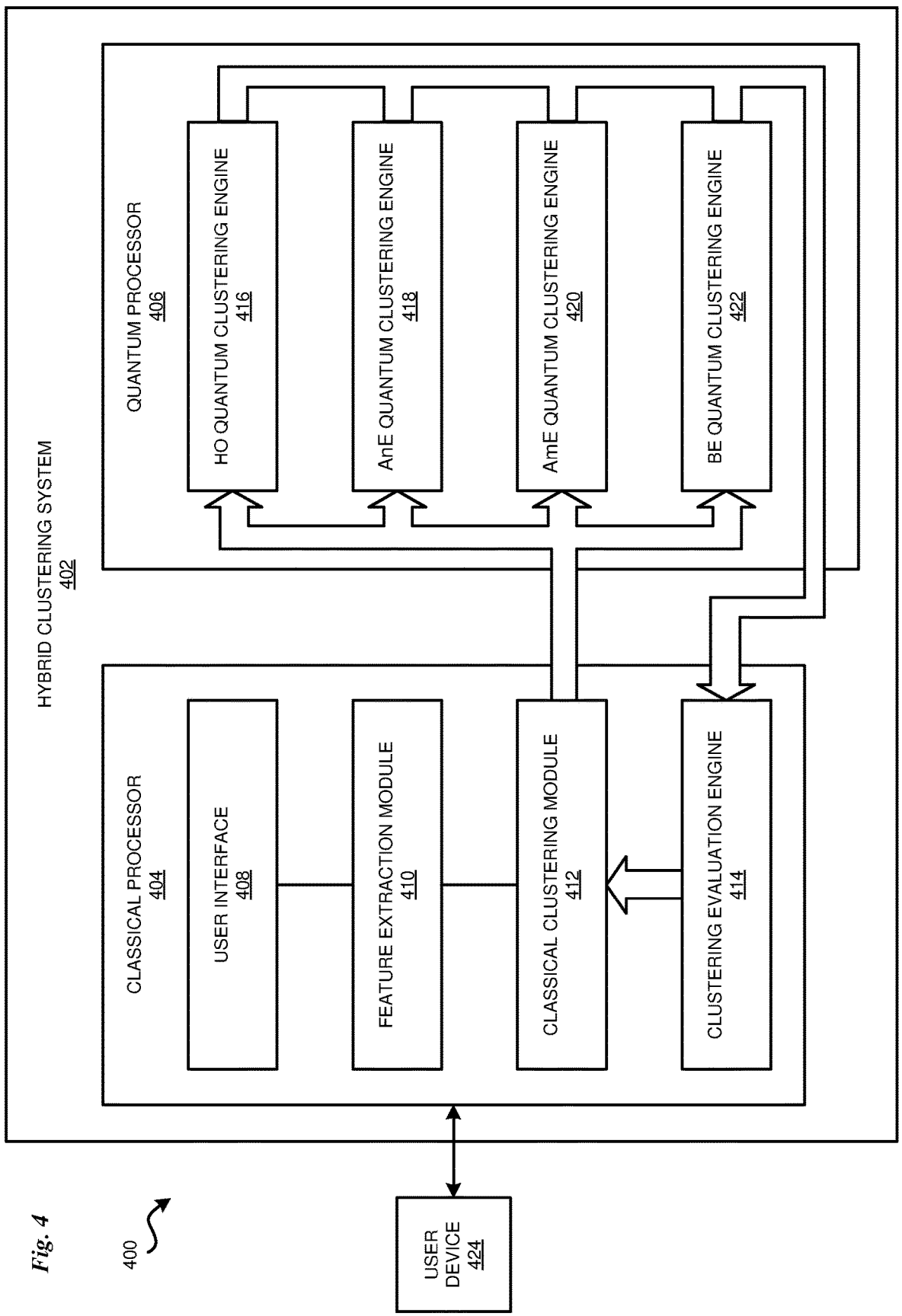
FIG. 4 depicts a block diagram of a computing environment that includes a hybrid clustering system in accordance with an illustrative embodiment.

With reference to FIG. 4, this figure depicts a block diagram of a computing environment 400 that includes a hybrid clustering system 402 in accordance with an illustrative embodiment. In a particular embodiment, hybrid clustering system 402 is an example of hybrid clustering system 304 of FIG. 3.

In some embodiments, the hybrid clustering system 402 includes a classical processor 404 and a quantum processor 406. The hybrid clustering system 402 also includes a user interface 408, a feature extraction module 410, a classical clustering module 412, and a clustering evaluation engine 414 associated with the classical processor 404. The hybrid clustering system 402 further includes an HO quantum clustering engine 416, an AnE quantum clustering engine 418, an AmE quantum clustering engine 420, and a BE quantum clustering engine 422 associated with the quantum processor 406. The user interface 408 is configured to communicate with one or more users via a user device 424. In alternative embodiments, the hybrid clustering system 402 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the hybrid clustering system 402 automatically generates a hierarchical data structure using a hybrid hierarchical clustering process. For example, in some embodiments, an Agglomerative Hierarchical clustering algorithm may be used to generate the hierarchical data structure, where the hierarchical data structure is a dendogram representation of the results of the agglomerative clustering algorithm.

Figure 12:
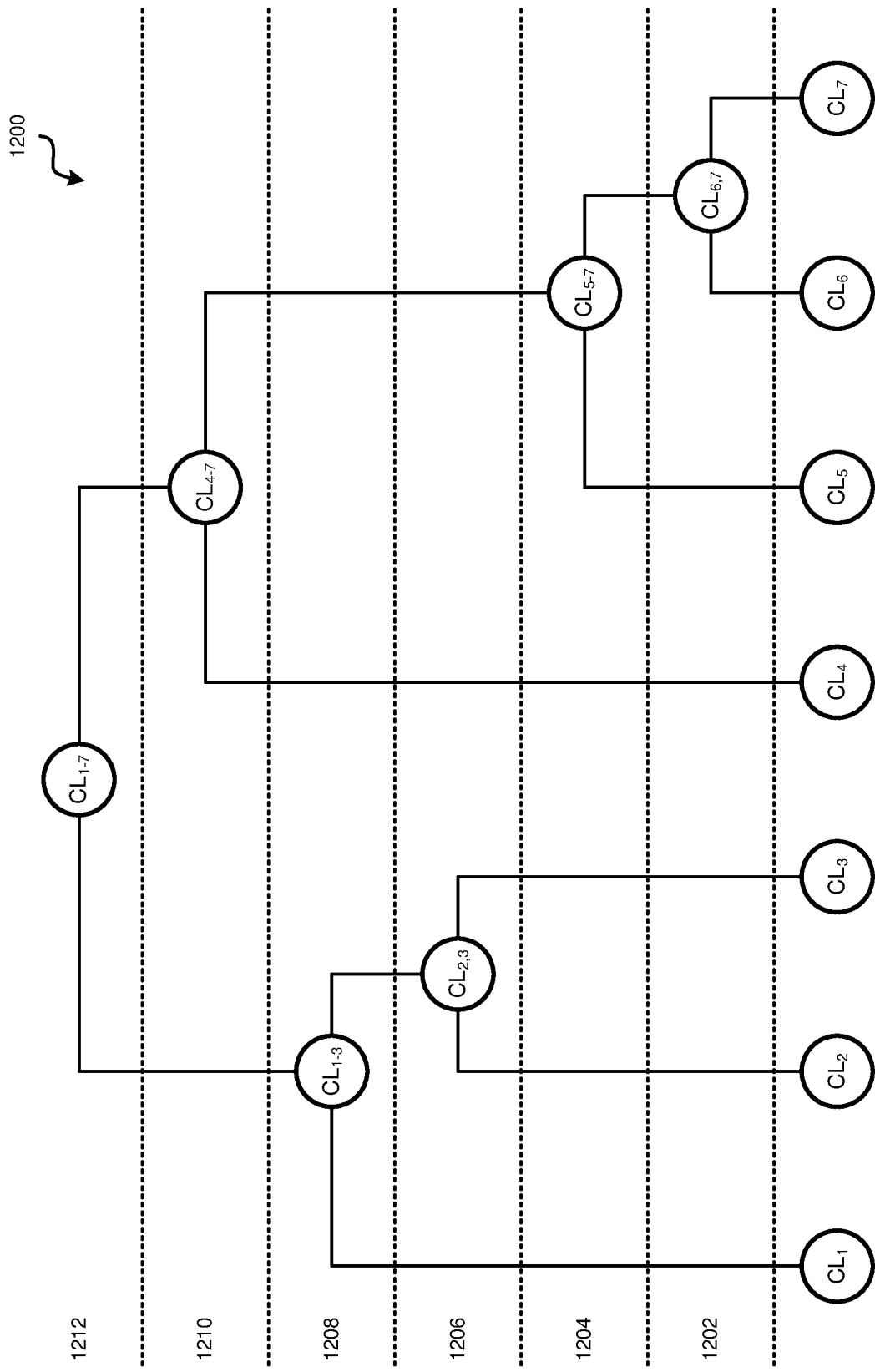
FIG. 12 depicts a graphical view of a dendogram as an exemplary hierarchical data structure in accordance with an illustrative embodiment.

Referring to FIG. 12 in addition to FIG. 4, FIG. 12 depicts a graphical view of a hierarchical data structure 1200 (or dendogram 1200) as an exemplary hierarchical data structure in accordance with an illustrative embodiment. In some embodiments, the hierarchical data structure 1200 comprises a plurality of objects (shown as clusters $CL_i$) that span a plurality of levels 1202-1212 from a lowest level 1202 of single-object clusters $CL_1$ to $CL_7$ to a highest level comprising a final cluster $CL_{1-7}$ of the clusters.

In some embodiments, initially, each data point is considered a separate cluster $CL_1$ to $CL_7$ on a first or lowest level 1202 of the hierarchical data structure 1200. The data points are then be merged by the clustering algorithm as it progresses through iterations of a level-building process to form larger clusters with multiple data points such that the number of clusters decreases with the addition of each new level. In some embodiments, the hybrid clustering system 402 automatically performs one or more iterations of the level-building process using classical encoding by the classical processor 404 and quantum encoding by the quantum processor 406 for at least one iteration.

To facilitate the merger of data points, the distances between each pair of data points may be computed, for example, by using any known distance, similarity, or dissimilarity measurement technique. For example, in some embodiments, clustering is based on distance, which is measured using a known technique such as Euclidean Distance, Manhattan Distance, Minkowski Distance, Jaccard Similarity Coefficient, Cosine Similarity, or Gower's Similarity Coefficient. As another example, in some embodiments, clustering is based on similarity or dissimilarity, which is measured using a known technique such as single linkage, complete linkage, average linkage, centroid method, or Ward's method. In some embodiments, a new cluster is formed as each new level is added by combining the closest or most similar clusters.

While the above description illustrates an agglomerative clustering algorithm being used to cluster data points, one skilled in the art will recognize that any appropriate clustering algorithm may be used. For example, the k-means clustering or other hierarchical clustering algorithms may be used instead of the agglomerative clustering described above.

In the illustrated embodiment, the user interface 408 receives a data set comprising data representative of objects that are provided for clustering. For example, in some such embodiments, the data set is received from a user who seeks to organize the objects into groups. The data set may include data representative of any kind of real or virtual objects that are sought to be organized into clusters.

In the illustrated embodiment, the feature extraction module 410 performs various types of data preprocessing, which typically includes feature learning and feature extraction and encoding, which are performed here using the classical processor 404. The feature extraction module 410 may use any desired known techniques, such as an autoencoder, for reducing the feature space.

In the illustrated embodiment, the block arrows connecting the classical clustering module 412 to the HO quantum clustering engine 416, AnE quantum clustering engine 418, AmE quantum clustering engine 420, and BE quantum clustering engine 422, and then to the clustering evaluation engine 414, and back to the classical clustering module 412 represent elements and communication paths used for iterations of a level building process. In some embodiments, the level building process builds a hierarchical data structure using a hybrid hierarchical clustering process. In some such embodiments, the hierarchical data structure results from one or more iterations of the level-building process that includes clustering of classical-encoded data by the classical processor 404 and clustering of quantum-encoded data by the quantum processor 406.

In some embodiments, the classical clustering module 412 builds, using the classical processor 404, a first parent level of a current uppermost level of the hierarchical data structure. For example, in the hierarchical data structure 1200 shown in FIG. 12, the process begins with the first level 1202 of the hierarchical data structure 1200 comprising each of the classically-encoded objects in respective single-object clusters $CL_1$ to $CL_7$. In some such embodiments, for the first iteration of the level building process, the first level is level 1202, so the classical processor 404 builds a first parent level of the first level, i.e., the second level 1204, of the hierarchical data structure 1200. Upon completion of the first parent level, the first parent level built by the classical processor 404 becomes the current uppermost level of the hierarchical data structure.

Next, the quantum processor 406 identifies a set of candidate clustering options for clustering quantum-encoded clusters of the current uppermost level. In some embodiments, the quantum processor 406 encodes the data of the current uppermost level in a plurality of different quantum encoding spaces. In the illustrated embodiment, the hybrid clustering system 402 includes the HO quantum clustering engine 416 that performs Higher Order encoding, an AnE quantum clustering engine 418 that performs Angle Encoding, an AmE quantum clustering engine 420 that performs Amplitude Encoding, and a BE quantum clustering engine 422 that performs Basis Encoding. The quantum processor 406 then forms each of the set of candidate clustering options in parallel using the respective different quantum clustering engines 416-422.

In the illustrated embodiment, the clustering evaluation engine 414 builds, using the classical processor, a second parent level (e.g., level 1206 of FIG. 12 during a first iteration) based on a subset of the candidate clustering options. For example, in some embodiments, the clustering evaluation engine 414 determines the accuracy of each of the candidate clustering options created by the quantum processing and drops the least accurate clustering option. In addition, the encoding space associated with the least accurate clustering option will not be used for subsequent iterations of the level building process. The remaining clustering options then form a subset of the candidate clustering options, and the clustering evaluation engine 414 uses that subset to build the second parent level of the hierarchical data structure.

In some embodiments, the clustering evaluation engine 414 decodes each of the subset of candidate clustering options into classically-encoded clusters, thereby forming a subset of classically-encoded candidate clustering options of the set of candidate clustering options. In some such embodiments, the clustering evaluation engine 414 determines classically-encoded clusters of the second parent level based on averaging corresponding classically-encoded candidate clusters of each of the subset of classically-encoded candidate clustering options.

In the illustrated embodiment, the clustering evaluation engine 414 also determines if halting criteria has been met, which would indicate that the clustering process has been completed. For example, in some embodiments, the halting criteria may include a target number of clusters, in which case the clustering evaluation engine 414 would determine if the existing hierarchical data structure includes no more than the target number of clusters. If the halting condition is satisfied, then the process ends. Otherwise, the classical processor 404 initiates another iteration of the level-building process.

In some embodiments, before beginning another iteration of the level-building process, the clustering evaluation engine 414 tests the accuracy of the clusters in classical encoding space. The results of the accuracy test are then used as a basis for determining the scope of the next iteration of the level-building process. Specifically, if an accuracy threshold is met, then the next iteration of the level-building process is performed as described above beginning with the classical encoding by the classical clustering module 412. On the other hand, if the accuracy threshold is not met, then the next iteration of the level-building process is performed, but bypasses the classical clustering module 412.

Also, note that for each iteration of the level-building process, the number of quantum encodings n is reduced by 1. In some embodiments, the process determines the accuracy of each of the candidate clustering options created by the quantum processing and excludes the least accurate clustering option for subsequent iterations of the level building process.

Figure 5:
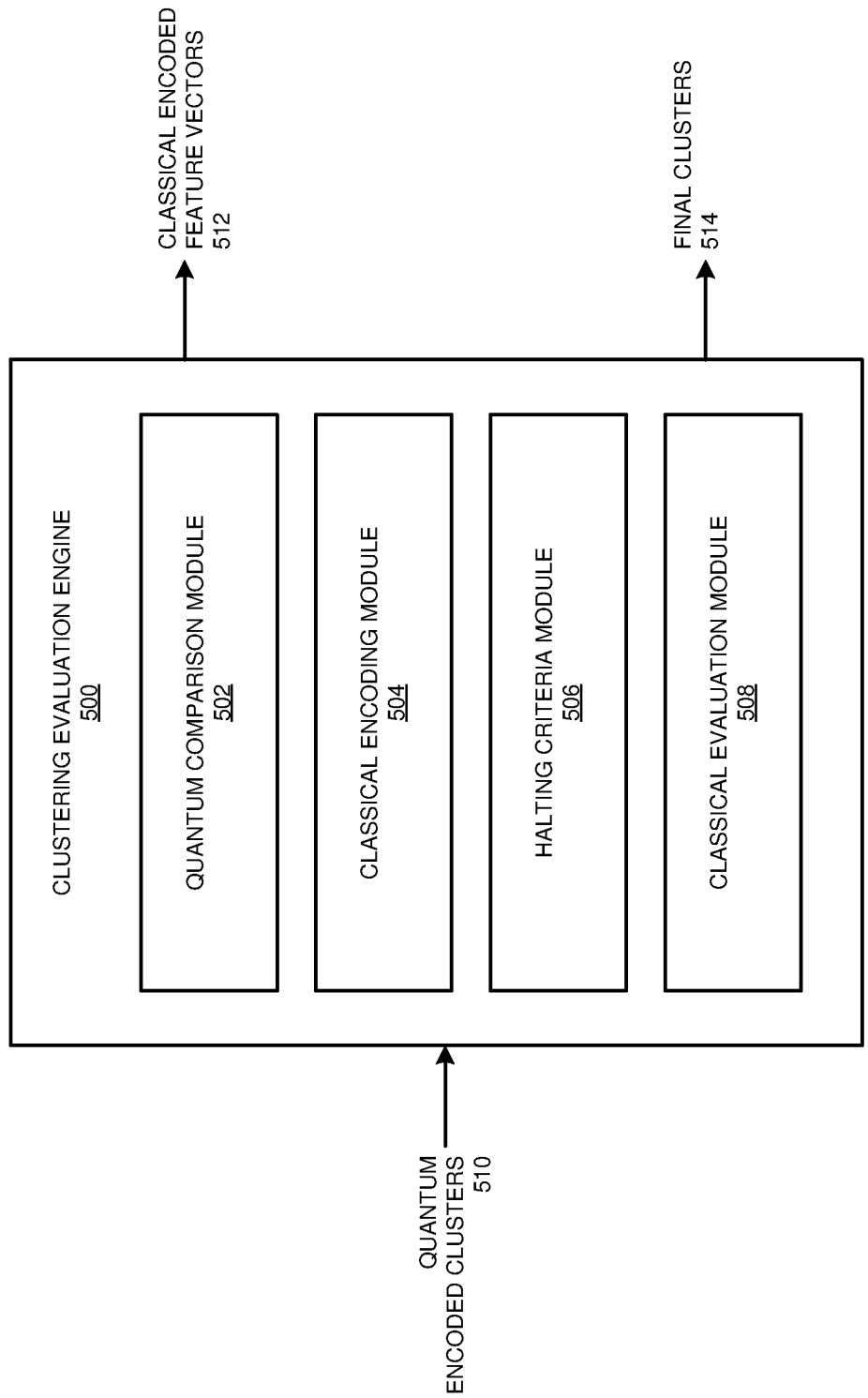
FIG. 5 depicts a block diagram of a clustering evaluation engine in accordance with an illustrative embodiment.

With reference to FIG. 5, this figure depicts a block diagram of a clustering evaluation engine 500 in accordance with an illustrative embodiment. In a particular embodiment, hybrid clustering system 500 is an example of clustering evaluation engine 414 of FIG. 4.

In some embodiments, the hybrid clustering system 500 includes a quantum comparison module 502, a classical encoding module 504, a halting criteria module 506, and a classical evaluation module 508. In alternative embodiments, the hybrid clustering system 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the quantum comparison module 502 receives the quantum encoded clusters 510 (from the clustering engine 416, AnE quantum clustering engine 418, AmE quantum clustering engine 420, and/or a BE quantum clustering engine 422 of FIG. 4). The quantum comparison module 502 builds, using the classical processor, a second parent level based on a subset of the candidate clustering options received as the quantum encoded clusters 510. In some embodiments, the quantum comparison module 502 determines the accuracy of each of the candidate clustering options created by the quantum processing and drops the least accurate clustering option. In addition, the encoding space associated with the least accurate clustering option will not be used for subsequent iterations of the level building process.

The remaining clustering options then form a subset of the candidate clustering options, and the quantum comparison module 502 uses that subset to build the second parent level of the hierarchical data structure. In some embodiments, the quantum comparison module 502 decodes each of the subset of candidate clustering options into classically-encoded clusters, thereby forming a subset of classically-encoded candidate clustering options of the set of candidate clustering options. In some such embodiments, the quantum comparison module 502 determines classically-encoded clusters for the second parent level based on averaging corresponding classically-encoded candidate clusters of each of the subset of classically-encoded candidate clustering options.

In the illustrated embodiment, the halting criteria module 506 determines if halting criteria has been met, which would indicate that the clustering process has been completed. For example, in some embodiments, the halting criteria may include a target number of clusters, in which case the halting criteria module 506 would determine if the existing hierarchical data structure includes no more than the target number of clusters. If the halting condition is satisfied, then the process ends and the halting criteria module 506 outputs the final clusters 514 to data storage. Otherwise, the classical processor initiates another iteration of the level-building process.

In some embodiments, before beginning another iteration of the level-building process, the classical evaluation module 508 tests the accuracy of the clusters in classical encoding space. The results of the accuracy test are then used as a basis for determining the scope of the next iteration of the level-building process. Specifically, if an accuracy threshold is met, then the next iteration of the level-building process is performed as described above with reference to FIG. 4.

Also, note that for each iteration of the level-building process, the number of quantum encodings n is reduced by 1. In some embodiments, the process determines the accuracy of each of the candidate clustering options created by the quantum processing and excludes the least accurate clustering option for subsequent iterations of the level building process.

Figure 6:
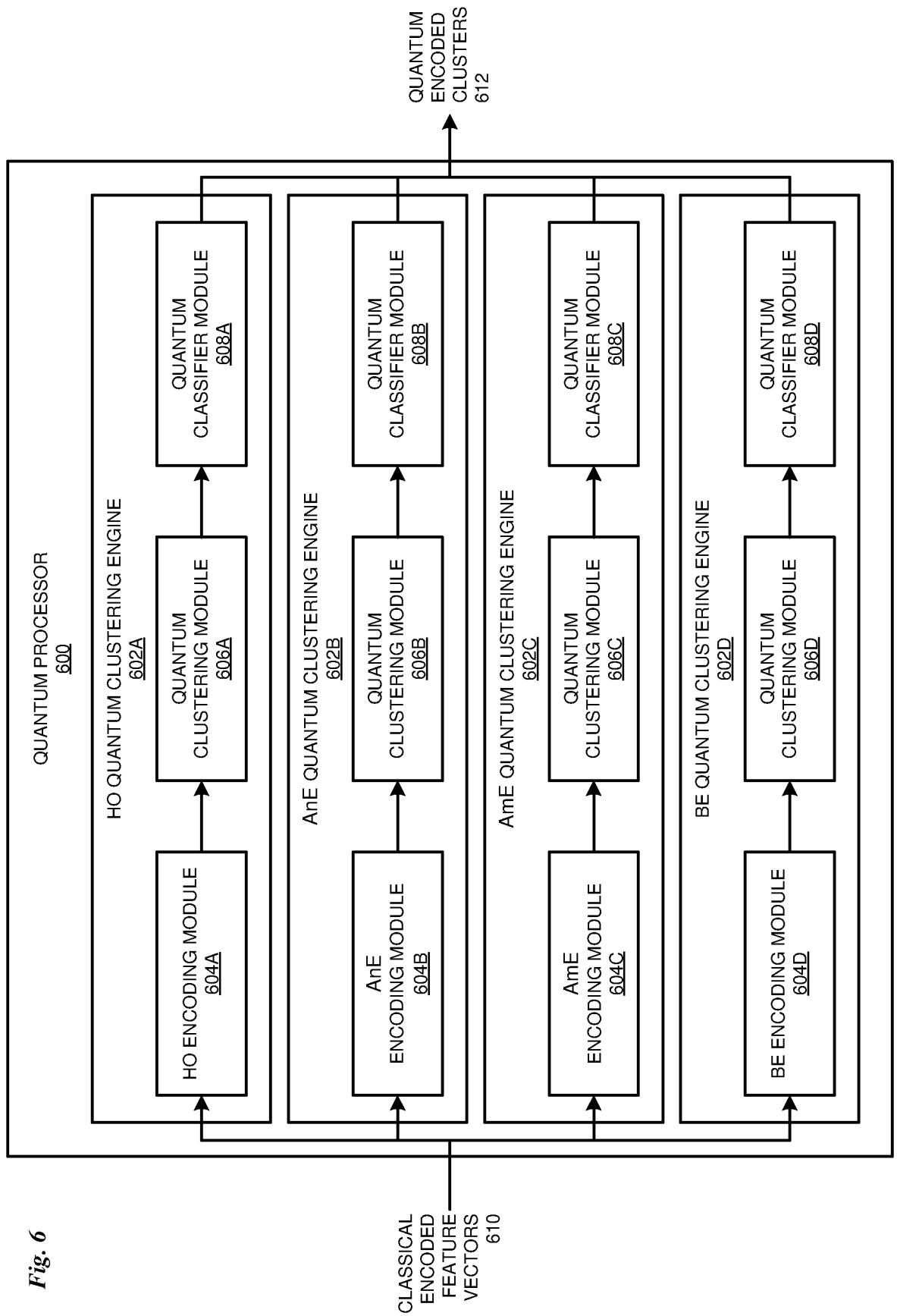
FIG. 6 depicts a block diagram of a quantum processor associated with an HO quantum clustering engine A, AnE quantum clustering engine B, AmE quantum clustering engine C, and BE quantum clustering engine D (collectively clustering engines) in accordance with an illustrative embodiment.

With reference to FIG. 6, this figure depicts a block diagram of a quantum processor 600 associated with an HO quantum clustering engine 602A, AnE quantum clustering engine 602B, AmE quantum clustering engine 602C, and BE quantum clustering engine 602D (collectively clustering engines 602) in accordance with an illustrative embodiment. In a particular embodiment, quantum processor 600 is an example of quantum processor 406 of FIG. 4.

In some embodiments, clustering engines 602 include an HO encoding module 604A, AnE encoding module 604B, AmE encoding module 604C, and BE encoding module 604D, (collectively encoding modules 604), respectively. The clustering engines 602 also include respective ones of the quantum clustering modules 606A-606D (collectively quantum clustering modules 606) and respective ones of the quantum classifier modules 607A-608D (collectively quantum classifier modules 608). In alternative embodiments, the clustering engines 602 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the clustering engines 602 each receive the classical encoded feature vectors 610. In some embodiments, the encoding modules 604 encode the data of the classical encoded feature vectors 610 in their respective different quantum encoding spaces. In the illustrated embodiment, the HO encoding module 604A performs Higher Order encoding, the AnE encoding module 604B performs Angle Encoding, the AmE encoding module 604C performs Amplitude Encoding, and the BE encoding module 604D performs Basis Encoding. In some embodiments, the quantum clustering modules 606 then form respective ones of the set of candidate clustering options in parallel based on distance. Alternatively, in some embodiments, the quantum classifier modules 608 form respective ones of the set of candidate clustering options in parallel based on similarity. The resulting set of candidate clustering options is then output as quantum encoded clusters 612.

Figure 7:
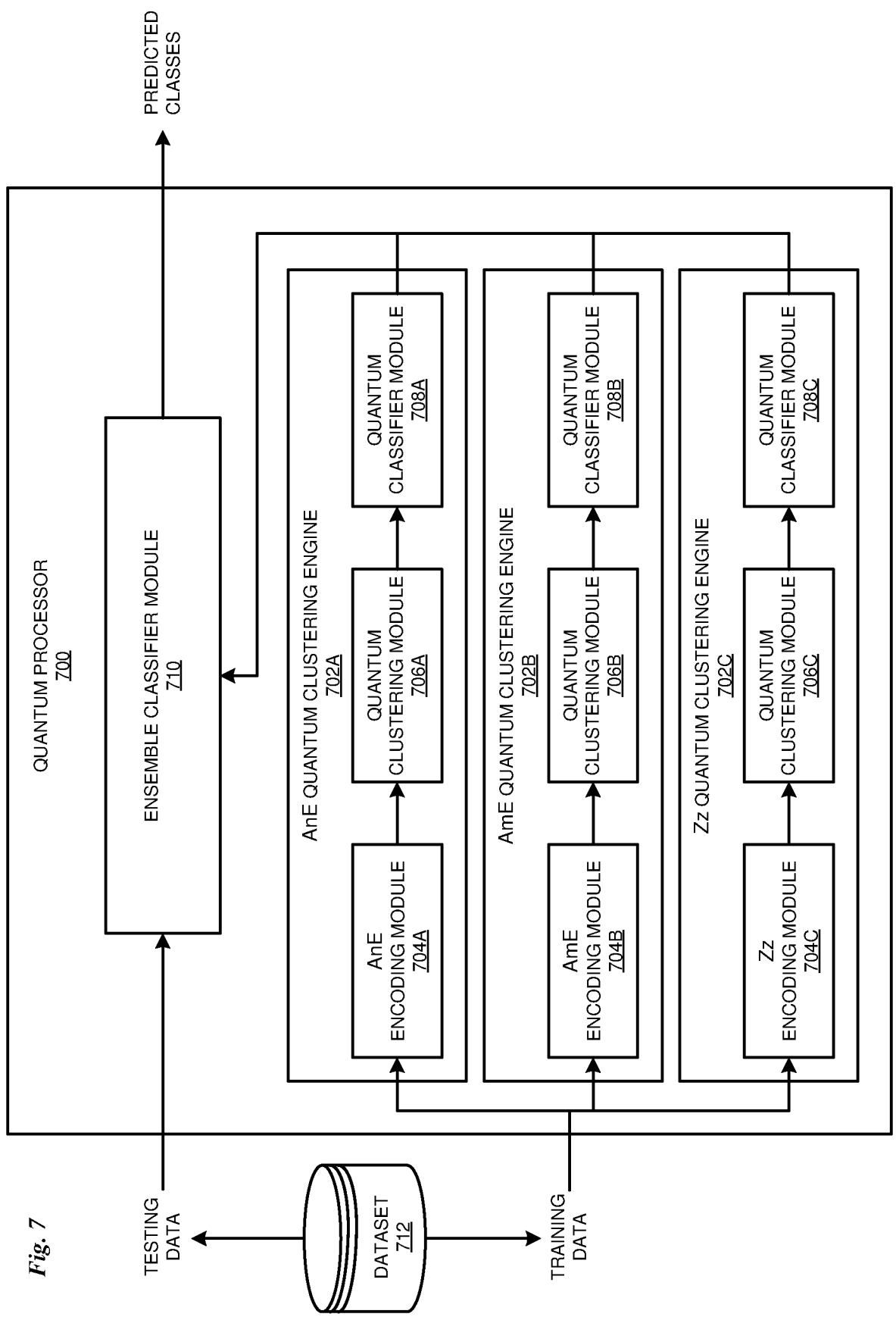
FIG. 7 depicts a block diagram of a quantum processor configured to operate as a classification ensemble model in accordance with an illustrative embodiment.

With reference to FIG. 7, this figure depicts a block diagram of a quantum processor 700 configured to operate as a classification ensemble model in accordance with an illustrative embodiment. In a particular embodiment, quantum processor 700 is an example of quantum processor 600 of FIG. 6, clustering engines 702A-702C are examples of clustering engines 602 of FIG. 6, encoding modules 704A-704C are examples of encoding modules 604 of FIG. 6, quantum clustering modules 706A-706C are examples of quantum clustering modules 606 of FIG. 6, and quantum classifier modules 708A-708B are examples of quantum classifier modules 608 of FIG. 6.

In some embodiments, a dataset to be classified is divided into training data and testing data. The clustering engines 702 and respective sets of modules operate as described in FIG. 6 for clustering engines 602. The outputs from the clustering engines 702 are provided to an ensemble classifier module 710. In some embodiments, the ensemble classifier module 710 combines corresponding clusters received from each of the clustering engines 702, for example by averaging location values of respective corresponding data points. In the illustrated embodiment, during a training phase, the clustering engines 702 form clusters as described herein. Then, the clusters are tested using the test data during a testing phase. During the testing phase, the ensemble classifier module 710 receives the test data from the dataset 712 and compares the classifications resulting from the clusters to expected values in the test data in order to evaluate the accuracy of the clusters formed during the training phase.

Figure 8:
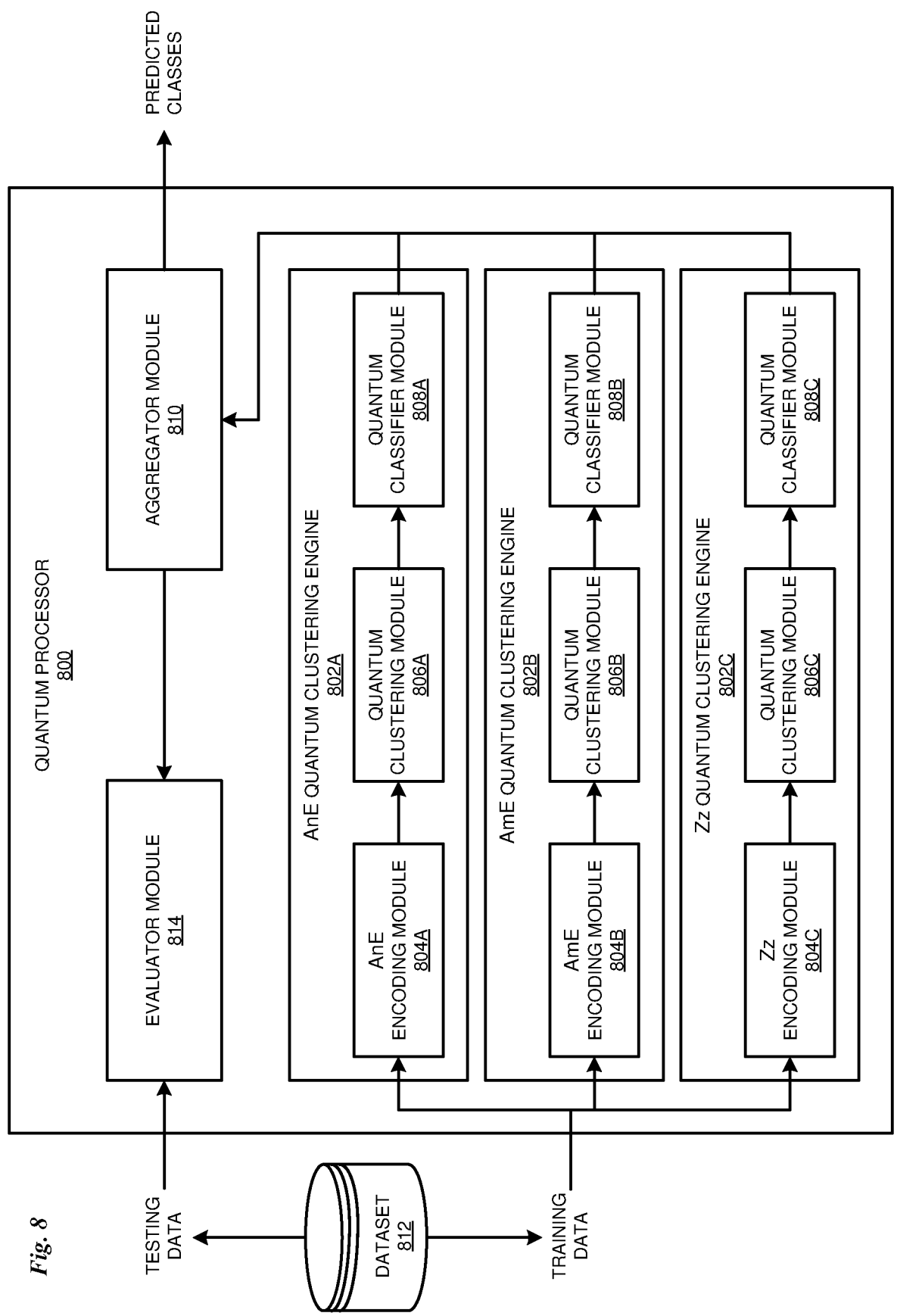
FIG. 8 depicts a block diagram of a quantum processor configured to operate as a classification model in accordance with an illustrative embodiment.

With reference to FIG. 8, this figure depicts a block diagram of a quantum processor 800 configured to operate as a classification model in accordance with an illustrative embodiment. In a particular embodiment, quantum processor 800 is an example of quantum processor 600 of FIG. 6, clustering engines 802A-802C are examples of clustering engines 602 of FIG. 6, encoding modules 804A-804C are examples of encoding modules 604 of FIG. 6, quantum clustering modules 806A-806C are examples of quantum clustering modules 606 of FIG. 6, and quantum classifier modules 808A-808B are examples of quantum classifier modules 608 of FIG. 6.

In some embodiments, a dataset to be classified is divided into training data and testing data. The clustering engines 802 and respective sets of modules operate as described in FIG. 6 for clustering engines 602. The outputs from the clustering engines 802 are provided to an aggregator module 810.

In the illustrated embodiment, instead of outputting a set of the candidate clustering options to be combined by a classical processor (e.g., by clustering evaluation engine 414 of FIG. 4), the aggregator module 810 combines the set of the candidate clustering options using the quantum processor. Thus, in some such embodiments, the clustering evaluation engine 414 would not need to combine the candidate clustering options and would simply bypass that part of the processing, but otherwise proceed as described herein.

In the illustrated embodiment, during a training phase, the clustering engines 802 form clusters as described herein. Then, the clusters are tested using the test data during a testing phase. During the testing phase, the aggregator module 810 provides the combined clusters to an evaluator module 814. The evaluator module 814 also receives the test data from the dataset 812 and compares the classifications resulting from the clusters to expected values in the test data in order to evaluate the accuracy of the clusters formed during the training phase.

Figure 9:
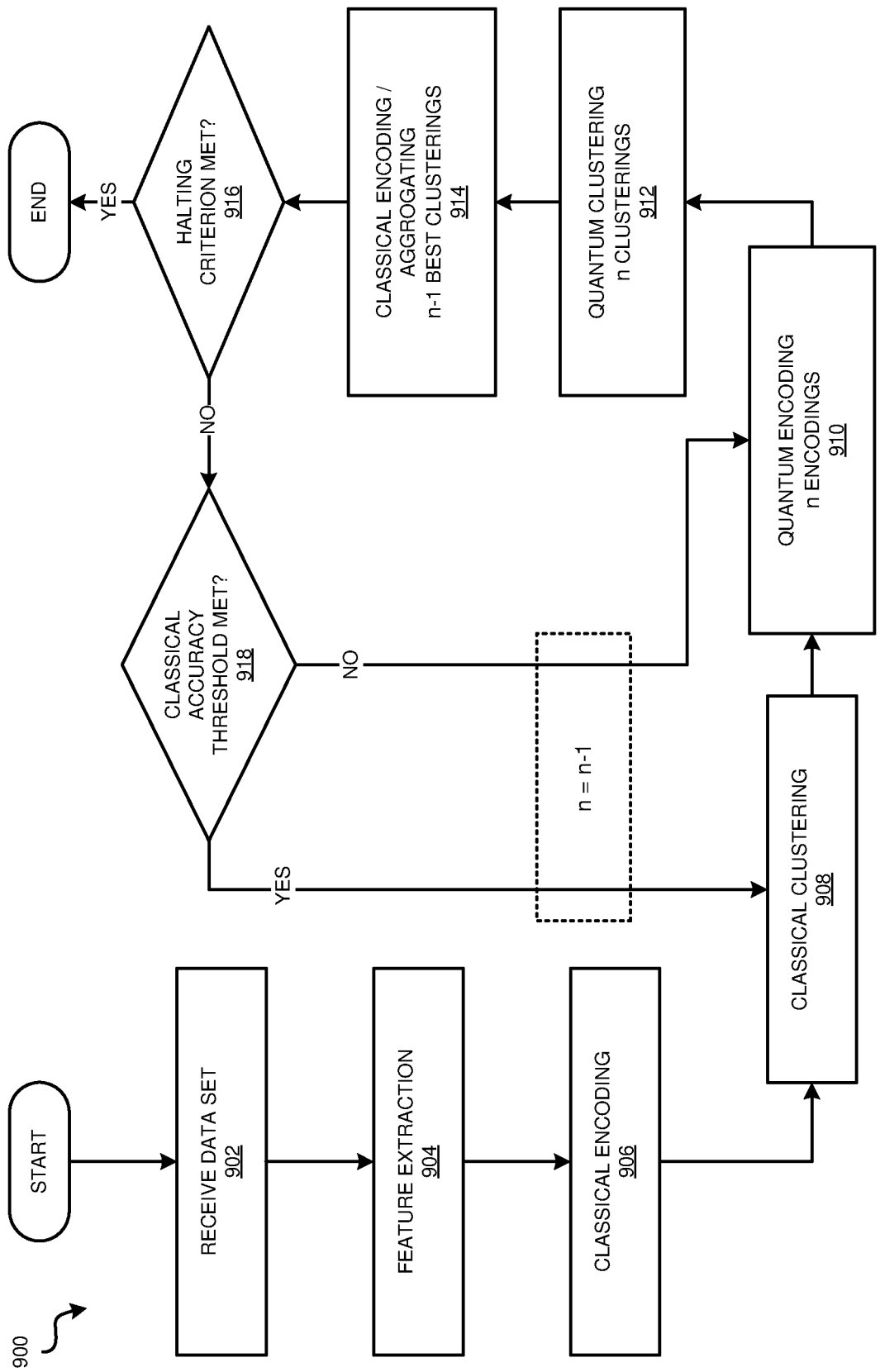
FIG. 9 depicts a flowchart of an example process for data clustering using analysis of multiple encoding techniques in accordance with an illustrative embodiment.

With reference to FIG. 9, this figure depicts a flowchart of an example process 900 for data clustering using analysis of multiple encoding techniques in accordance with an illustrative embodiment. In some embodiments, the process 900 includes building a hierarchical data structure using a hybrid hierarchical clustering process. In some such embodiments, the hierarchical data structure results from one or more iterations of a level-building process that includes clustering of classical-encoded data by a classical processor and clustering of quantum-encoded data by a quantum processor. In a particular embodiment, the hybrid clustering system 402 of FIG. 4 carries out the process 900.

In an embodiment, at block 902, the process receives a data set comprising data representative of objects that are provided for clustering. For example, in some such embodiments, the data set is received from a user who seeks to organize the objects into groups. The data set may include data representative of any kind of real or virtual objects that are sought to be organized into clusters.

Next, blocks 904 and 906 are representative of data preprocessing, which typically includes feature learning and feature extraction and encoding, which are performed here using a classical processor. The feature extraction and classical encoding may include known techniques, such as an autoencoder, for reducing the feature space.

In some embodiments, blocks 908, 910, and 912 are part of an iteration of a level-building process. At block 908, the process includes building, by a classical processor, a first parent level of a current uppermost level of the hierarchical data structure by clustering classically-encoded clusters of the current uppermost level. Upon completion of the first parent level, the first parent level becomes the current uppermost level of the hierarchical data structure.

Next, at block 910, the process includes identifying, by a quantum processor, a set of candidate clustering options for clustering quantum-encoded clusters of the current uppermost level. In some embodiments, the identifying includes encoding the data of the current uppermost level in a plurality of different quantum encoding spaces. For example, in an embodiment, the process encodes the data using basis encoding, amplitude encoding, angle encoding, and higher order encoding.

Next, at block 912, the process forming each of the set of candidate clustering options in parallel using respective different quantum encoding spaces. For example, in an embodiment, the process encodes the data using basis encoding, amplitude encoding, angle encoding, and higher order encoding, and then forms a first candidate clustering option in the basis encoding space, forms a second candidate clustering option in the amplitude encoding space, forms a third candidate clustering option in the angle encoding space, and forms a fourth candidate clustering option in the higher order encoding space.

Next, at block 914, the process builds, by the classical processor, a second parent level based on a subset of the candidate clustering options. For example, in some embodiments, the process determines the accuracy of each of the candidate clustering options created by the quantum processing and drops the least accurate clustering option. In addition, the encoding space associated with the least accurate clustering option will not be used for subsequent iterations of the level building process (indicated by n=n−1 after block 918, where n equals the number of quantum encoding spaces being used). The remaining clustering options then form a subset of the candidate clustering options, and that subset is used to build the second parent level of the hierarchical data structure. In some embodiments, the process includes decoding each of the subset of candidate clustering options into classically-encoded clusters, thereby forming a subset of classically-encoded candidate clustering options of the set of candidate clustering options. In some such embodiments, the process includes determining classically-encoded clusters of the second parent level based on averaging corresponding classically-encoded candidate clusters of each of the subset of classically-encoded candidate clustering options.

Next, at block 916, the process determines if halting criteria has been met, which would indicate that the clustering process has been completed. For example, in some embodiments, the halting criteria may include a target number of clusters, in which case the process would determine if the existing hierarchical data structure includes no more than the target number of clusters. If the halting condition is satisfied, then the process ends. Otherwise, the process continues to block 918.

In block 918, before beginning another iteration of the level-building process, a test the accuracy of the clusters in classical encoding space is performed. The results of the accuracy test are then used as a basis for determining the scope of the next iteration of the level-building process. Specifically, if an accuracy threshold is met, then the next iteration of the level-building process is performed as described above beginning with the classical encoding 908. On the other hand, if the accuracy threshold is not met, then the next iteration of the level-building process is performed, but bypasses the classical encoding 908.

Also, note that for each iteration of the level-building process, the number of quantum encodings n is reduced by 1. As discussed in connection with block 914, in some embodiments, the process determines the accuracy of each of the candidate clustering options created by the quantum processing and excludes the least accurate clustering option for subsequent iterations of the level building process (indicated by n=n−1 after block 918, where n equals the number of quantum encoding spaces being used).

Figure 10:
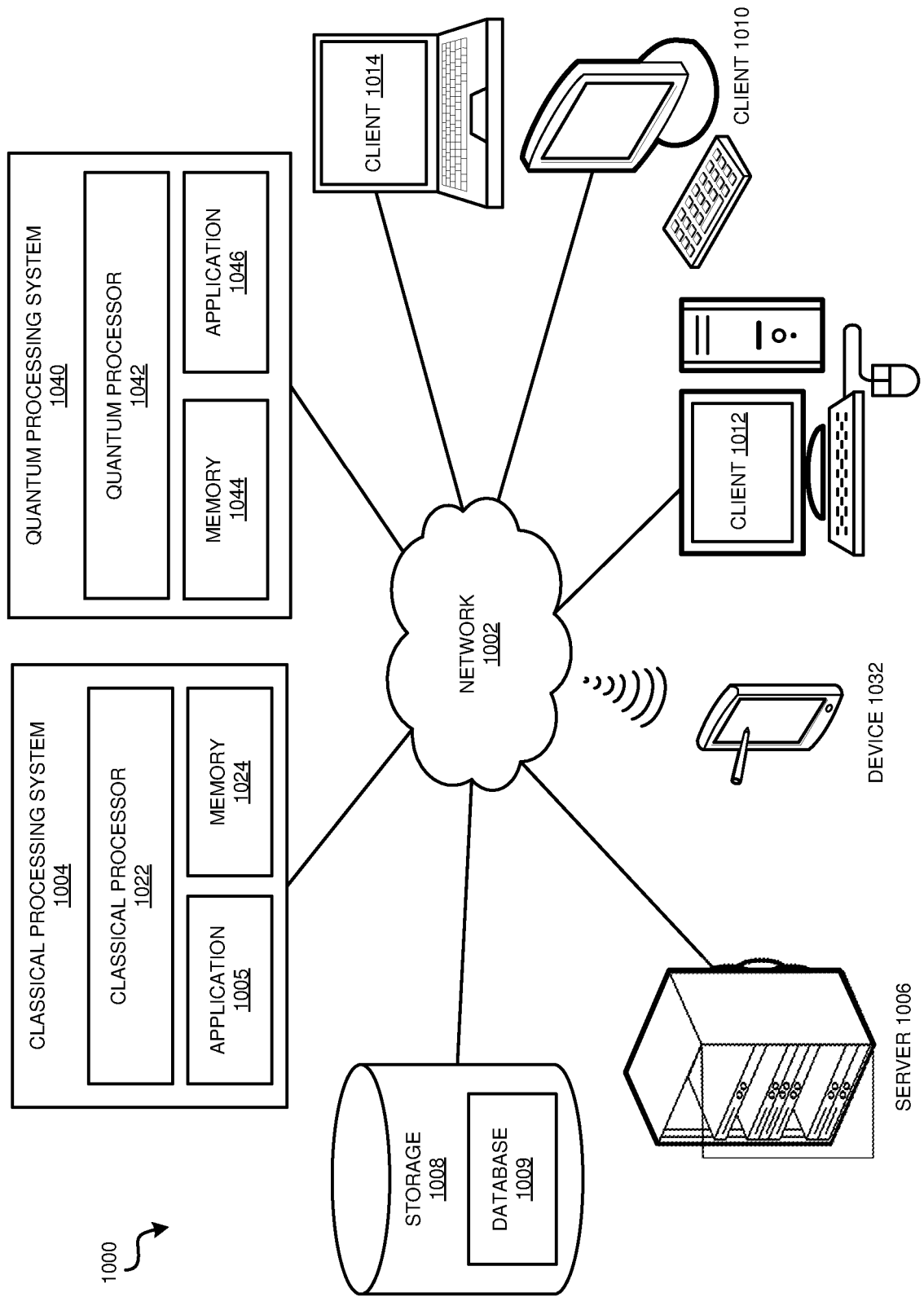
FIG. 10 depicts a block diagram of a network of data processing systems in which illustrative embodiments may be implemented.
Figure 11:
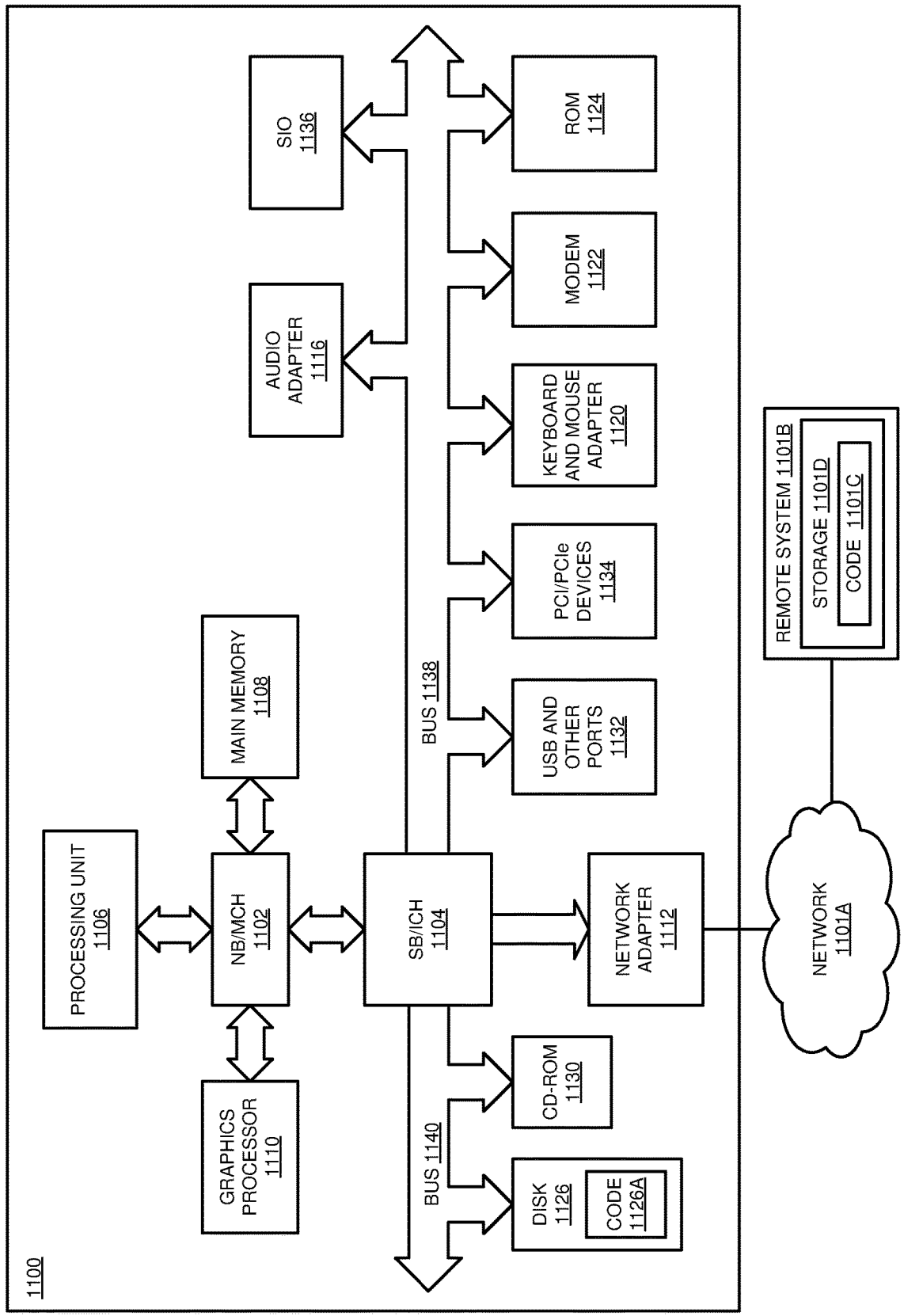
FIG. 11 depicts a block diagram of a data processing system in which illustrative embodiments may be implemented.

With reference to FIGS. 10 and 11, these figures are example diagrams of data processing environments in which illustrative embodiments may be implemented. FIGS. 10 and 11 are only examples and are not intended to assert or imply any limitation with regard to the environments in which different embodiments may be implemented. A particular implementation may make many modifications to the depicted environments based on the following description.

With reference to FIG. 10, this figure depicts a block diagram of a network of data processing systems in which illustrative embodiments may be implemented. Data processing environment 1000 is a network of computers in which the illustrative embodiments may be implemented. Data processing environment 1000 includes network 1002. Network 1002 is the medium used to provide communications links between various devices and computers connected together within data processing environment 1000. Network 1002 may include connections, such as wire, wireless communication links, or fiber optic cables.

Clients or servers are only example roles of certain data processing systems connected to network 1002 and are not intended to exclude other configurations or roles for these data processing systems. Classical processing system 1004 couples to network 1002. Classical processing system 1004 is a classical processing system. Software applications may execute on any quantum data processing system in data processing environment 1000. Any software application described as executing in classical processing system 1004 in FIG. 10 can be configured to execute in another data processing system in a similar manner. Any data or information stored or produced in classical processing system 1004 in FIG. 10 can be configured to be stored or produced in another data processing system in a similar manner. A classical data processing system, such as classical processing system 1004, may contain data and may have software applications or software tools executing classical computing processes thereon.

Server 1006 couples to network 1002 along with storage unit 1008. Storage unit 1008 includes a database 1009 configured to store neural network training data as described herein with respect to various embodiments. Server 1006 is a conventional data processing system. Quantum processing system 1040 couples to network 1002. Quantum processing system 1040 is a quantum data processing system. Software applications may execute on any quantum data processing system in data processing environment 1000. Any software application described as executing in quantum processing system 1040 in FIG. 10 can be configured to execute in another quantum data processing system in a similar manner. Any data or information stored or produced in quantum processing system 1040 in FIG. 10 can be configured to be stored or produced in another quantum data processing system in a similar manner. A quantum data processing system, such as quantum processing system 1040, may contain data and may have software applications or software tools executing quantum computing processes thereon.

Clients 1010, 1012, and 1014 are also coupled to network 1002. A conventional data processing system, such as server 1006, or client 1010, 1012, or 1014 may contain data and may have software applications or software tools executing conventional computing processes thereon.

Only as an example, and without implying any limitation to such architecture, FIG. 10 depicts certain components that are usable in an example implementation of an embodiment. For example, server 1006, and clients 1010, 1012, 1014, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 1006, 1010, 1012, and 1014 also represent example nodes in a cluster, partitions, and other configurations suitable for implementing an embodiment.

Device 1032 is an example of a conventional computing device described herein. For example, device 1032 can take the form of a smartphone, a tablet computer, a laptop computer, client 1010 in a stationary or a portable form, a wearable computing device, or any other suitable device. Any software application described as executing in another conventional data processing system in FIG. 10 can be configured to execute in device 1032 in a similar manner. Any data or information stored or produced in another conventional data processing system in FIG. 10 can be configured to be stored or produced in device 1032 in a similar manner.

Server 1006, storage unit 1008, classical processing system 1004, quantum processing system 1040, and clients 1010, 1012, and 1014, and device 1032 may couple to network 1002 using wired connections, wireless communication protocols, or other suitable data connectivity. Clients 1010, 1012, and 1014 may be, for example, personal computers or network computers.

In the depicted example, server 1006 may provide data, such as boot files, operating system images, and applications to clients 1010, 1012, and 1014. Clients 1010, 1012, and 1014 may be clients to server 1006 in this example. Clients 1010, 1012, 1014, or some combination thereof, may include their own data, boot files, operating system images, and applications. Data processing environment 1000 may include additional servers, clients, and other devices that are not shown.

In the depicted example, memory 1024 may provide data, such as boot files, operating system images, and applications to classical processor 1022. Classical processor 1022 may include its own data, boot files, operating system images, and applications. Data processing environment 1000 may include additional memories, quantum processors, and other devices that are not shown. Memory 1024 includes application 1005 that may be configured to implement one or more of the classical processor functions described herein for correcting bias on a hybrid classical-quantum computing system in accordance with one or more embodiments.

In the depicted example, memory 1044 may provide data, such as boot files, operating system images, and applications to quantum processor 1042. Quantum processor 1042 may include its own data, boot files, operating system images, and applications. Data processing environment 1000 may include additional memories, quantum processors, and other devices that are not shown. Memory 1044 includes application 1046 that may be configured to implement one or more of the quantum processor functions described herein in accordance with one or more embodiments.

In the depicted example, data processing environment 1000 may be the Internet. Network 1002 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 1000 also may be implemented as a number of different types of networks, such as for example, an intranet, a local area network (LAN), or a wide area network (WAN). FIG. 10 is intended as an example, and not as an architectural limitation for the different illustrative embodiments.

Among other uses, data processing environment 1000 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 1000 may also employ a service-oriented architecture where interoperable software components distributed across a network may be packaged together as coherent business applications. Data processing environment 1000 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 11, this figure depicts a block diagram of a data processing system in which illustrative embodiments may be implemented. Data processing system 1100 is an example of a conventional computer, such as classical processing system 1004, server 1006, or clients 1010, 1012, and 1014 in FIG. 10, or another type of device in which computer usable program code or instructions implementing the processes may be located for the illustrative embodiments.

Data processing system 1100 is also representative of a conventional data processing system or a configuration therein, such as conventional data processing system 1032 in FIG. 10 in which computer usable program code or instructions implementing the processes of the illustrative embodiments may be located. Data processing system 1100 is described as a computer only as an example, without being limited thereto. Implementations in the form of other devices, such as device 1032 in FIG. 10, may modify data processing system 1100, such as by adding a touch interface, and even eliminate certain depicted components from data processing system 1100 without departing from the general description of the operations and functions of data processing system 1100 described herein.

In the depicted example, data processing system 1100 employs a hub architecture including North Bridge and memory controller hub (NB/MCH) 1102 and South Bridge and input/output (I/O) controller hub (SB/ICH) 1104. Processing unit 1106, main memory 1108, and graphics processor 1110 are coupled to North Bridge and memory controller hub (NB/MCH) 1102. Processing unit 1106 may contain one or more processors and may be implemented using one or more heterogeneous processor systems. Processing unit 1106 may be a multi-core processor. Graphics processor 1110 may be coupled to NB/MCH 1102 through an accelerated graphics port (AGP) in certain implementations.

In the depicted example, local area network (LAN) adapter 1112 is coupled to South Bridge and I/O controller hub (SB/ICH) 1104. Audio adapter 1116, keyboard and mouse adapter 1120, modem 1122, read only memory (ROM) 1124, universal serial bus (USB) and other ports 1132, and PCI/PCIe devices 1134 are coupled to South Bridge and I/O controller hub 1104 through bus 1138. Hard disk drive (HDD) or solid-state drive (SSD) 1126 and CD-ROM 1130 are coupled to South Bridge and I/O controller hub 1104 through bus 1140. PCI/PCIe devices 1134 may include, for example, Ethernet adapters, add-in cards, and PC cards for notebook computers. PCI uses a card bus controller, while PCIe does not. ROM 1124 may be, for example, a flash binary input/output system (BIOS). Hard disk drive 1126 and CD-ROM 1130 may use, for example, an integrated drive electronics (IDE), serial advanced technology attachment (SATA) interface, or variants such as external-SATA (eSATA) and micro-SATA (mSATA). A super I/O (SIO) device 1136 may be coupled to South Bridge and I/O controller hub (SB/ICH) 1104 through bus 1138.

Memories, such as main memory 1108, ROM 1124, or flash memory (not shown), are some examples of computer usable storage devices. Hard disk drive or solid-state drive 1126, CD-ROM 1130, and other similarly usable devices are some examples of computer usable storage devices including a computer usable storage medium.

An operating system runs on processing unit 1106. The operating system coordinates and provides control of various components within data processing system 1100 in FIG. 11. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 1100.

Instructions for the operating system, the object-oriented programming system, and applications or programs, such as application 1005 in FIG. 10, are located on storage devices, such as in the form of code 1126A on hard disk drive 1126, and may be loaded into at least one of one or more memories, such as main memory 1108, for execution by processing unit 1106. The processes of the illustrative embodiments may be performed by processing unit 1106 using computer implemented instructions, which may be located in a memory, such as, for example, main memory 1108, read only memory 1124, or in one or more peripheral devices.

Furthermore, in one case, code 1126A may be downloaded over network 1101A from remote system 1101B, where similar code 1101C is stored on a storage device 1101D. in another case, code 1126A may be downloaded over network 1101A to remote system 1101B, where downloaded code 1101C is stored on a storage device 1101D.

The hardware in FIGS. 10-11 may vary depending on the implementation. Other internal hardware or peripheral devices, such as flash memory, equivalent non-volatile memory, or optical disk drives and the like, may be used in addition to or in place of the hardware depicted in FIGS. 10-11. In addition, the processes of the illustrative embodiments may be applied to a multiprocessor data processing system.

In some illustrative examples, data processing system 1100 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 1108 or a cache, such as the cache found in North Bridge and memory controller hub 1102. A processing unit may include one or more processors or CPUs.

The depicted examples in FIGS. 10-11 and above-described examples are not meant to imply architectural limitations. For example, data processing system 1100 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 1100 using virtualized manifestation of some or all components depicted in data processing system 1100. For example, in a virtual machine, virtual device, or virtual component, processing unit 1106 is manifested as a virtualized instance of all or some number of hardware processing units 1106 available in a host data processing system, main memory 1108 is manifested as a virtualized instance of all or some portion of main memory 1108 that may be available in the host data processing system, and disk 1126 is manifested as a virtualized instance of all or some portion of disk 1126 that may be available in the host data processing system. The host data processing system in such cases is represented by data processing system 1100.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A method for hybrid classical-quantum clustering, the method comprising:
   building a hierarchical data structure using a hybrid hierarchical clustering process, wherein the hierarchical data structure comprises a plurality of objects that span a plurality of levels from a lowest level of single-object clusters to a highest level comprising a final cluster of the clusters, wherein the hybrid hierarchical clustering process comprises an iteration of a level-building process comprising:
      building, by a classical processor, a first parent level of a current uppermost level of the hierarchical data structure by clustering classically-encoded clusters of the current uppermost level,
      wherein, upon completion of the first parent level, the first parent level becomes the current uppermost level of the hierarchical data structure;
      identifying, by a quantum processor, a set of candidate clustering options for clustering quantum-encoded clusters of the current uppermost level for a second parent level, wherein the identifying comprises forming each of the set of candidate clustering options by encoding, in parallel, data of the current uppermost level using respective different quantum encoding spaces, wherein the forming each of the set of candidate clustering options comprises forming a first candidate clustering option in a basis encoding space, forming a second candidate clustering option in an amplitude encoding space, forming a third candidate clustering option in an angle encoding space, and forming a fourth candidate clustering option in a higher-order encoding space, wherein the encoding of the data using respective different quantum encoding spaces comprises encoding the data as at least one of a superposition of a quantum space, a rotation of a quantum space, and a probability amplitude value of a quantum system wavefunction; and
      building, by the classical processor, the second parent level based on a subset of the candidate clustering options;
      wherein, upon completion of the second parent level, the second parent level becomes the current uppermost level of the hierarchical data structure;
   determining, by the classical processor, whether to perform another iteration of at least a portion of the level-building process based at least in part on a comparison of the hierarchical data structure to an exit criterion; and
   upon a determination to perform another iteration of at least a portion of the level-building process, performing another iteration of at least a portion of the level-building process.

2. The method of claim 1, wherein the iteration of the level-building process further comprises:
   determining accuracy values for respective candidate clustering options of the set of candidate clustering options, wherein each of the accuracy values is indicative of an accuracy of an associated candidate clustering option; and
   forming the subset of candidate clustering options based on the accuracy values such that the subset excludes a least accurate candidate clustering option of the set of candidate clustering options.

3. The method of claim 2, further comprising:
   identifying a least-accurate quantum encoding space as a quantum encoding space in which the least accurate candidate clustering option was encoded; and
   excluding the least-accurate quantum encoding space from future iterations of the level-building process.

4. The method of claim 2, wherein the building of the second parent level further comprises:
   decoding each of the subset of candidate clustering options into classically-encoded clusters resulting in a subset of classically-encoded candidate clustering options.

5. The method of claim 4, wherein the building of the second parent level further comprises:
   determining classically-encoded clusters of the second parent level based on averaging corresponding classically-encoded candidate clusters of each of the subset of classically-encoded candidate clustering options.

6. The method of claim 5, further comprising:
   calculating an accuracy of the classically-encoded clusters of the second parent level; and
   determining whether the accuracy of the classically-encoded clusters satisfies a threshold accuracy amount.

7. The method of claim 6, further comprising:
   excluding, in a case where the accuracy of the classically-encoded clusters is determined to fail to satisfy the threshold accuracy amount, the building of the first parent level from future iterations of the level-building process.

8. The method of claim 1, wherein each of the plurality of objects is represented by a respective feature vector of a plurality of feature vectors, and wherein the clustering of classically-encoded clusters is based at least in part on distance measures between pairs of the plurality of feature vectors.

9. A computer program product for hybrid classical-quantum clustering, the computer program product comprising one or more computer readable storage media, and program instructions collectively stored on the one or more computer readable storage media, the program instructions executable by one or more processors to cause the one or more processors to perform operations comprising:
building a hierarchical data structure using a hybrid hierarchical clustering process, wherein the hierarchical data structure comprises a plurality of objects that span a plurality of levels from a lowest level of single-object clusters to a highest level comprising a final cluster of the clusters, wherein the hybrid hierarchical clustering process comprises an iteration of a level-building process comprising:
building, by a classical processor, a first parent level of a current uppermost level of the hierarchical data structure by clustering classically-encoded clusters of the current uppermost level,
wherein, upon completion of the first parent level, the first parent level becomes the current uppermost level of the hierarchical data structure;
identifying, by a quantum processor, a set of candidate clustering options for clustering quantum-encoded clusters of the current uppermost level for a second parent level, wherein the identifying comprises forming each of the set of candidate clustering options by encoding, in parallel, data of the current uppermost level using respective different quantum encoding spaces, wherein the forming each of the set of candidate clustering options comprises forming a first candidate clustering option in a basis encoding space, forming a second candidate clustering option in an amplitude encoding space, forming a third candidate clustering option in an angle encoding space, and forming a fourth candidate clustering option in a higher-order encoding space, wherein the encoding of the data using respective different quantum encoding spaces comprises encoding the data as at least one of a superposition of a quantum space, a rotation of a quantum space, and a probability amplitude value of a quantum system wavefunction;
building, by the classical processor, the second parent level based on a subset of the candidate clustering options;
wherein, upon completion of the second parent level, the second parent level becomes the current uppermost level of the hierarchical data structure;
determining, by the classical processor, whether to perform another iteration of at least a portion of the level-building process based at least in part on a comparison of the hierarchical data structure to an exit criterion; and
upon a determination to perform another iteration of at least a portion of the level-building process, performing another iteration of at least a portion of the level-building process.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

12. The computer program product of claim 9, wherein the iteration of the level-building process further comprises:
determining accuracy values for respective candidate clustering options of the set of candidate clustering options, wherein each of the accuracy values is indicative of an accuracy of an associated candidate clustering option; and
forming the subset of candidate clustering options based on the accuracy values such that the subset excludes a least accurate candidate clustering option of the set of candidate clustering options.

13. The computer program product of claim 12, further comprising:
identifying a least-accurate quantum encoding space as a quantum encoding space in which the least accurate candidate clustering option was encoded; and
excluding the least-accurate quantum encoding space from future iterations of the level-building process.

14. The computer program product of claim 12, wherein the building of the second parent level further comprises:
decoding each of the subset of candidate clustering options into classically-encoded clusters resulting in a subset of classically-encoded candidate clustering options.

15. The computer program product of claim 14, wherein the building of the second parent level further comprises:
determining classically-encoded clusters of the second parent level based on averaging corresponding classically-encoded candidate clusters of each of the subset of classically-encoded candidate clustering options.

16. The computer program product of claim 15, further comprising:
calculating an accuracy of the classically-encoded clusters of the second parent level; and
determining whether the accuracy of the classically-encoded clusters satisfies a threshold accuracy amount.

17. The computer program product of claim 16, further comprising:
excluding, in a case where the accuracy of the classically-encoded clusters is determined to fail to satisfy the threshold accuracy amount, the building of the first parent level from future iterations of the level-building process.

18. A computer system comprising one or more processors and one or more computer readable storage media, and program instructions collectively stored on the one or more computer readable storage media, the program instructions executable by the one or more processors to cause the one or more processors to perform operations comprising:
building a hierarchical data structure using a hybrid hierarchical clustering process, wherein the hierarchical data structure comprises a plurality of objects that span a plurality of levels from a lowest level of single-object clusters to a highest level comprising a final cluster of the clusters, wherein the hybrid hierarchical clustering process comprises an iteration of a level-building process comprising:
building, by a classical processor, a first parent level of a current uppermost level of the hierarchical data structure by clustering classically-encoded clusters of the current uppermost level, wherein, upon completion of the first parent level, the first parent level becomes the current uppermost level of the hierarchical data structure;

identifying, by a quantum processor, a set of candidate clustering options for clustering quantum-encoded clusters of the current uppermost level for a second parent level, wherein the identifying comprises forming each of the set of candidate clustering options by encoding, in parallel, data of the current uppermost level using respective different quantum encoding spaces, wherein the forming each of the set of candidate clustering options comprises forming a first candidate clustering option in a basis encoding space, forming a second candidate clustering option in an amplitude encoding space, forming a third candidate clustering option in an angle encoding space, and forming a fourth candidate clustering option in a higher-order encoding space, wherein the encoding of the data using respective different quantum encoding spaces comprises encoding the data as at least one of a superposition of a quantum space, a rotation of a quantum space, and a probability amplitude value of a quantum system wavefunction;

building, by the classical processor, the second parent level based on a subset of the candidate clustering options;

wherein, upon completion of the second parent level, the second parent level becomes the current uppermost level of the hierarchical data structure;

determining, by the classical processor, whether to perform another iteration of at least a portion of the level-building process based at least in part on a comparison of the hierarchical data structure to an exit criterion; and upon a determination to perform another iteration of at least a portion of the level-building process, performing another iteration of at least a portion of the level-building process.

* * * * *